United States Patent
Slatkin

(10) Patent No.: US 11,852,653 B2
(45) Date of Patent: Dec. 26, 2023

(54) DUAL SPEED AND POSITION WHEEL TRANSDUCER

(71) Applicant: HYDRO-AIRE, INC. Subsidiary of Crane Co., Burbank, CA (US)

(72) Inventor: Andrew Brett Slatkin, Tarzana, CA (US)

(*) Notice: Subject to any disclaimer, the term of this patent is extended or adjusted under 35 U.S.C. 154(b) by 220 days.

(21) Appl. No.: 17/192,649

(22) Filed: Mar. 4, 2021

(65) Prior Publication Data
US 2021/0190810 A1   Jun. 24, 2021

Related U.S. Application Data

(63) Continuation-in-part of application No. 15/688,694, filed on Aug. 28, 2017, now Pat. No. 10,960,864.

(51) Int. Cl.
| | |
|---|---|
| B64C 25/42 | (2006.01) |
| B60T 8/32 | (2006.01) |
| G01P 3/488 | (2006.01) |
| B60T 8/17 | (2006.01) |

(52) U.S. Cl.
CPC ............ *G01P 3/488* (2013.01); *B60T 8/1703* (2013.01); *B64C 25/42* (2013.01); *B60T 8/325* (2013.01)

(58) Field of Classification Search
CPC . G01P 3/488; G01P 3/42; B64C 25/42; B60T 8/325
See application file for complete search history.

(56) References Cited

U.S. PATENT DOCUMENTS

| | | | |
|---|---|---|---|
| 6,935,193 B2 * | 8/2005 | Heisenberg | B62D 6/10 73/862.324 |
| 7,578,185 B2 * | 8/2009 | Ether | G01P 3/42 324/160 |

* cited by examiner

*Primary Examiner* — Assres H Woldemaryam
(74) *Attorney, Agent, or Firm* — Fulwider Patton LLP

(57) ABSTRACT

A wheel speed measuring device for an aircraft braking system uses dual technology packaged in a single transducer that incorporates the robust and reliable variable reluctance technology along with a secondary package for measuring position and velocity bi-directionally for low speed and taxi operations. The transducer of the present invention is preferably incorporated into the envelope of the axle to allow both retrofit on existing aircraft and to maintain existing axle design and configuration.

4 Claims, 6 Drawing Sheets

DUAL SPEED AND POSITION WHEEL TRANSDUCER

CROSS-REFERENCES TO RELATED APPLICATIONS

This is a continuation-in-part based on U.S. Ser. No. 15/688,694, filed Aug. 28, 2017, the content of which is incorporated by reference herein in its entirety.

BACKGROUND

Aircraft braking systems for multi-wheel brakes of complex aircraft, such as commercial or military transport aircraft, may include wheel speed transducers or sensors for measuring the instantaneous wheel speed of the individual wheels of aircraft landing gear. Such wheel speed transducers are particularly important in aircraft braking systems where maximum braking efficiency is desired for a variety of runway surface conditions. Wheel speed transducers for such braking systems convert the rotational speed of the associated axle wheel to electrical signals. This wheel speed signal is then employed by brake control circuitry such as antiskid control circuitry and/or automatic brake control circuitry to control the braking activity of the vehicle commanded by the pilot and brake control system. Wheel speed transducers, sometimes referred to as tachometers, include one part that is fixed to the axle or aircraft frame and another part that is connected to and rotates with the associated wheel. Accordingly, a coupler is generally required to interconnect the rotatable member to the wheel.

Some current wheel speed devices for aircraft antiskid systems employ variable reluctance mechanisms. Although these devices are reliable and robust, the amplitude of the wheel speed signal varies as a function of the wheel speed and the amplitude thus diminishes significantly as the rotational speed nears zero. These devices are also unable to distinguish a direction of wheel velocity, but are limited to a magnitude only.

Variable reluctance (VR) sensors require waveform shaping for their output to be digitally readable. The normal output of a VR sensor is an analog signal, shaped much like a sine wave. The frequency of the analog signal is proportional to the sensor's velocity output. This analog waveform must be squared up, and flattened off by a comparator-like electronic chip to become digitally readable. As used to measure angular velocity of a rotating wheel, when a sensor on the rotating wheel passes by the face of a magnet, the amount of magnetic flux passing through the magnet and consequently the coil can vary. When the magnet is close to the sensor, the flux is at a maximum. When the magnet is further away, the flux is reduced. The moving target thus results in a time-varying flux that induces a proportional voltage in the coil. Subsequent electronics are then used to process this signal to get a digital waveform that can be more readily counted and timed. However, as the velocity slows, the accuracy diminishes because conversion of the sine wave to a digital output becomes unstable and less reliable.

It has been hypothesized that shipboard unmanned aerial vehicles ("UAVs") will require locally referenced feedback for navigation, i.e., angular position of its wheels, in order to properly taxi on the deck. Similarly, proposed motorized taxi systems for airliners will require both the ability to measure zero wheel speed as well detection of movement in both forward and rearward directions. Aircraft designers recognize that aircraft braking systems using present technology are unable to meet these increased demands.

SUMMARY OF THE INVENTION

The present invention improves on the existing technology for use with antiskid brake control by adding the capability of accurately measuring both angular position and rotational velocity of the wheel as the wheel speed approaches zero. The present invention is further capable of determining angular position and rotational velocity in both the forward and reverse directions. In a first presently preferred embodiment, the invention uses dual technology packaged in a single transducer that incorporates the robust and reliable variable reluctance technology along with a secondary package for measuring position and velocity bi-directionally for low speed and taxi operations. The transducer of the present invention is preferably incorporated into the envelope of the axle to allow both retrofit on existing aircraft and to maintain existing axle design and configuration.

The secondary componentry for measuring angular position and velocity is, in a first preferred embodiment, a magnetic encoder with an angular resolver (or other discrete proximity probes such as capacitive probes, inductive probes, or Hall Effect probes). The invention is particularly suited for unmanned aerial vehicles and aircraft that use motorized landing gear systems for taxi operations.

In a second presently preferred embodiment of the present invention, a dual channel variable reluctance wheel speed device is combined with a multi-channel secondary measuring device with its own redundancy capability, such as a dual channel angular resolver. These, and other features of the present invention are set forth in the detailed description of the invention below along with the accompanying drawings.

DETAILED DESCRIPTION OF THE PREFERRED EMBODIMENTS

Figure 1:
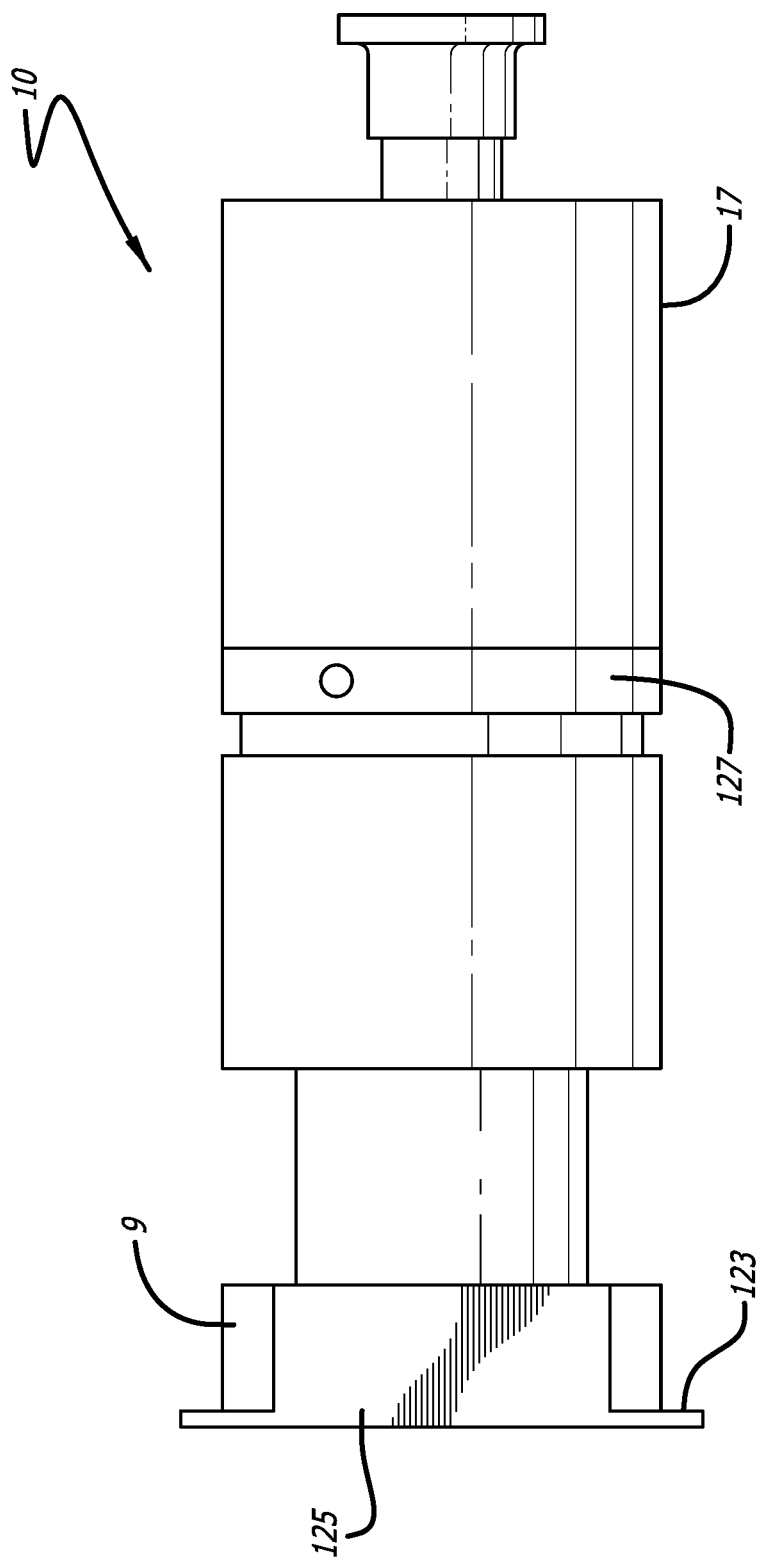
FIG. 1 is an elevated, perspective view of a transducer of the present invention.

The present invention provides a wheel speed transducer which is part of an antiskid braking system for an aircraft to prevent deep skids prior to controlled deceleration. Deep skids are a particular problem for aircraft, since repeated deep skids can damage tires and reduce braking efficiency. With reference to FIG. 1, the present invention is embodied in a wheel speed transducer 10 for each wheel brake of a landing gear of an aircraft, for measuring wheel speed and generating wheel speed signals that are a function of the rotational speed of the brake wheel. This embodiment of the wheel speed transducer includes a dual coil variable reluctance mechanism used for anti-skid control in combination with, and contained within the same housing as, a magnetic encoder that is used for wheel speed detection below approximately ten knots and for forward versus reverse motion detection, where the magnetic encoder can also be used to measure angular displacements of the wheel in addition to angular velocity. These two outputs (the variable reluctance transducer and the magnetic encoder) are independent of each other, and the combination allows the present invention to detect wheel speeds down to zero speed in forward and reverse directions.

Figure 2:
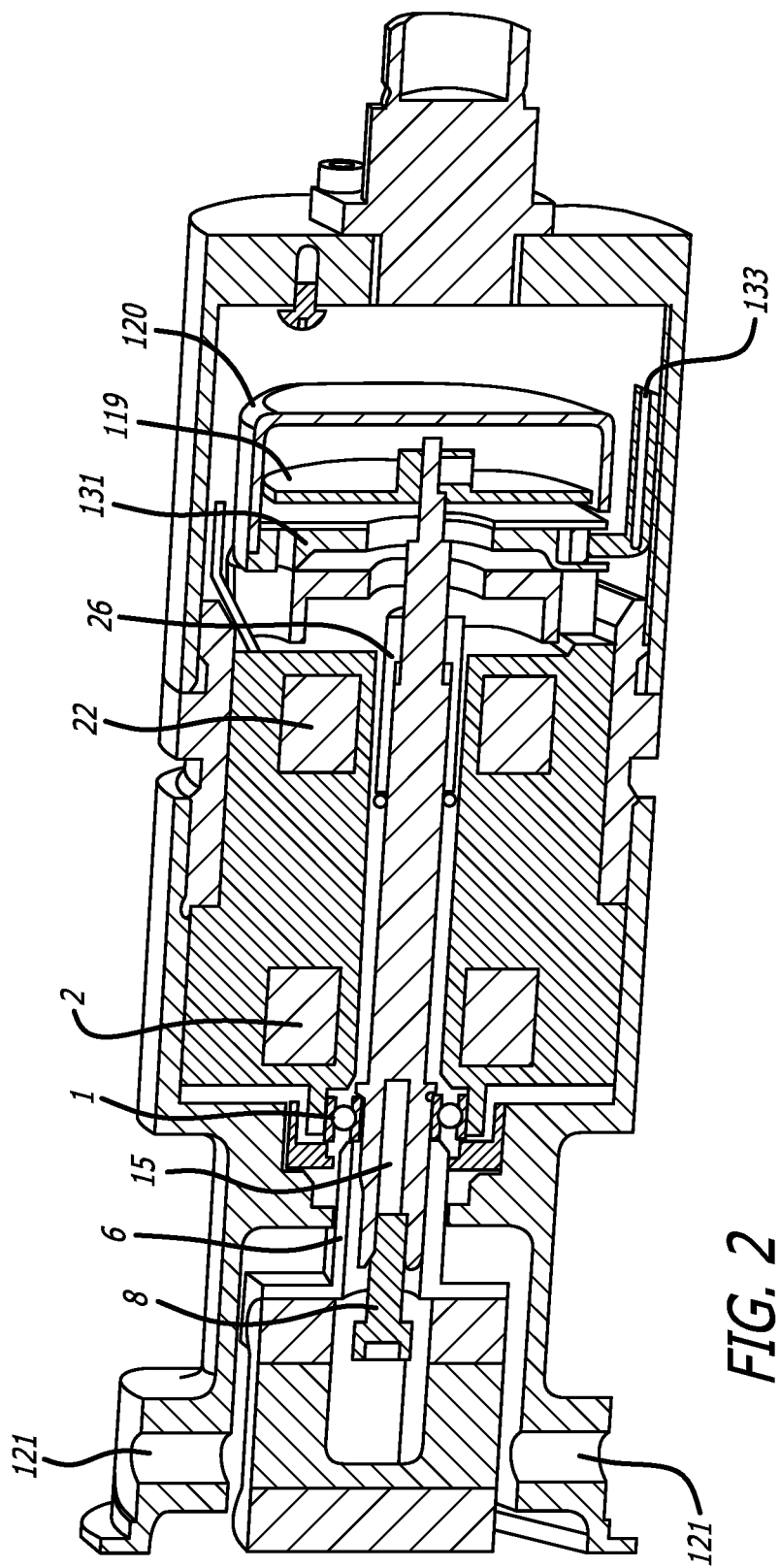
FIG. 2 is a first longitudinal cross sectional view of the transducer of FIG. 1.

The wheel speed transducer 10 of the present invention includes a cylindrical body section 17 of aluminum or the like that is mounted proximal to the axle of the aircraft landing gear. A fastener 8 connects the coupling component 6 to central shaft 15 of the speed transducer 10. The axle adapter 9 is formed with transverse holes 121 for receiving a fastener or pin (not shown) to help lock the adapter to the transducer. The flanged wheel axle adapter 9 is further formed with a radial lip 123 to establish the circumferential edge, and as further shown in FIG. 1 the wheel axle adapter 9 has first and second truncated, flattened sides 125. The adapter 9 is hollow and receives a coupling component 6 within its interior space (FIG. 2). The cylindrical body section 17 may include a medial circumferential recess 127 with spaced apertures for mounting the transducer 10 to the landing gear axle (not shown).

FIG. 2 illustrates the dual packages of the transducer for determining wheel speed and angular position in a singular housing. Within the hollow interior space of the flanged wheel axle adapter 9 is a coupling member 6 that is secured via fastener 8 to a central shaft 15 that rotates within the hollow central cavity of the body section 17 of the transducer 10. The shaft adapter 9 is mounted to a output shaft coupling 6 and imparts the wheel axle rotation onto the central shaft 15. The shaft 15 is supported at a proximal end by a bearing 7 with balls 1 that permit the shaft to freely rotate within the body section 17, and distally by a collar 26.

The assembly includes a primary coil 2 and a secondary coil 22 about the central shaft 15 that serves to form the dual coil variable reluctance speed detector. The variable reluctance transducer assembly is used for antiskid control and is used for speeds above ten knots. The rotor assembly 25 and accompanying electronics function in a well-known manner to generate a somewhat sinusoidal output signal (or signals in this case of a dual coil assembly) having a frequency that varies linearly as a function of instantaneous wheel speed.

Figure 3:
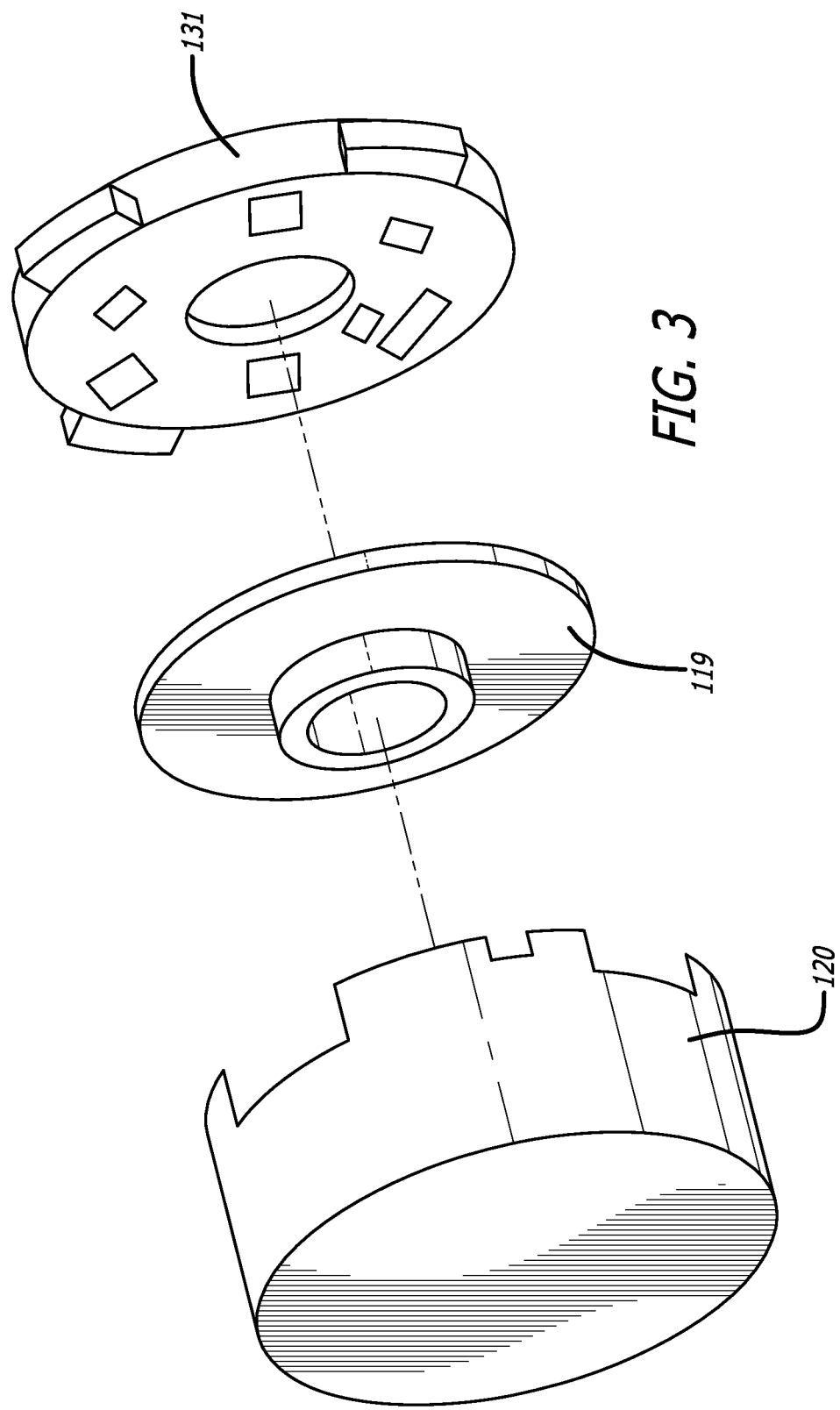
FIG. 3 is an enlarged, exploded view of the magnetic encoder of FIG. 2.

Additionally disposed in the body 17 of the transducer package in a first preferred embodiment is an encoder assembly (see FIG. 3 for an enlarged view) mounted at the end of the shaft 15, where the encoder assembly includes a magnetic encoder wheel 119 disposed about the main shaft 15. In this embodiment, the magnetic encoder wheel is enclosed by a cylindrical encoder cover 120. The magnetic encoder wheel 119 is a magnetized wheel that rotates in close proximity to a pair of magnetic sensors arranged on a fixed circuit board 131 in order to produce quadrature signals whose frequency and phasing represent the rotational velocity, i.e., the rotational speed and direction. The quadrature signals are fed via a cable to an off-board, signal conditioning, electronic circuitry. The number of magnetized pole pairs on the magnetic encoder wheel 119 determines the angular resolution of the magnetic encoder 119. The magnetic encoder is anticipated to be used primarily for speeds below ten knots and to detect such movement in forward and reverse directions. The two velocity outputs, i.e., electrical signals representing the wheel speed as measured by the variable reluctance mechanism as well as that measured by the magnetic encoder, are completely independent of each other.

The rotor/stator assembly coupled with the magnetic encoder assembly 119 in the same housing 17 allows for both traditional wheel speed determination and dual position/velocity/direction determination in the same compact, robust transducer.

Other embodiments of the present invention may utilize other subassemblies to measure angular position and velocity in place of the magnetic encoder assembly 19. These other embodiments can use an optical encoder assembly, which as designed produces the same type of electrical quadrature signals as that of the magnetic encoder. Such an embodiment would be connected to similar, or identical, signal conditioning, electronic circuitry. Another, alternate embodiment replaces the magnetic encoder assembly with an angular resolver. Angular resolvers are often used to measure rotational position and velocity of rotating, mechanical components under harsh environmental conditions. An embodiment that incorporates an angular resolver would require a different form of signal conditioning, electronic circuitry for conversion of the output, electrical signals.

Figure 4:
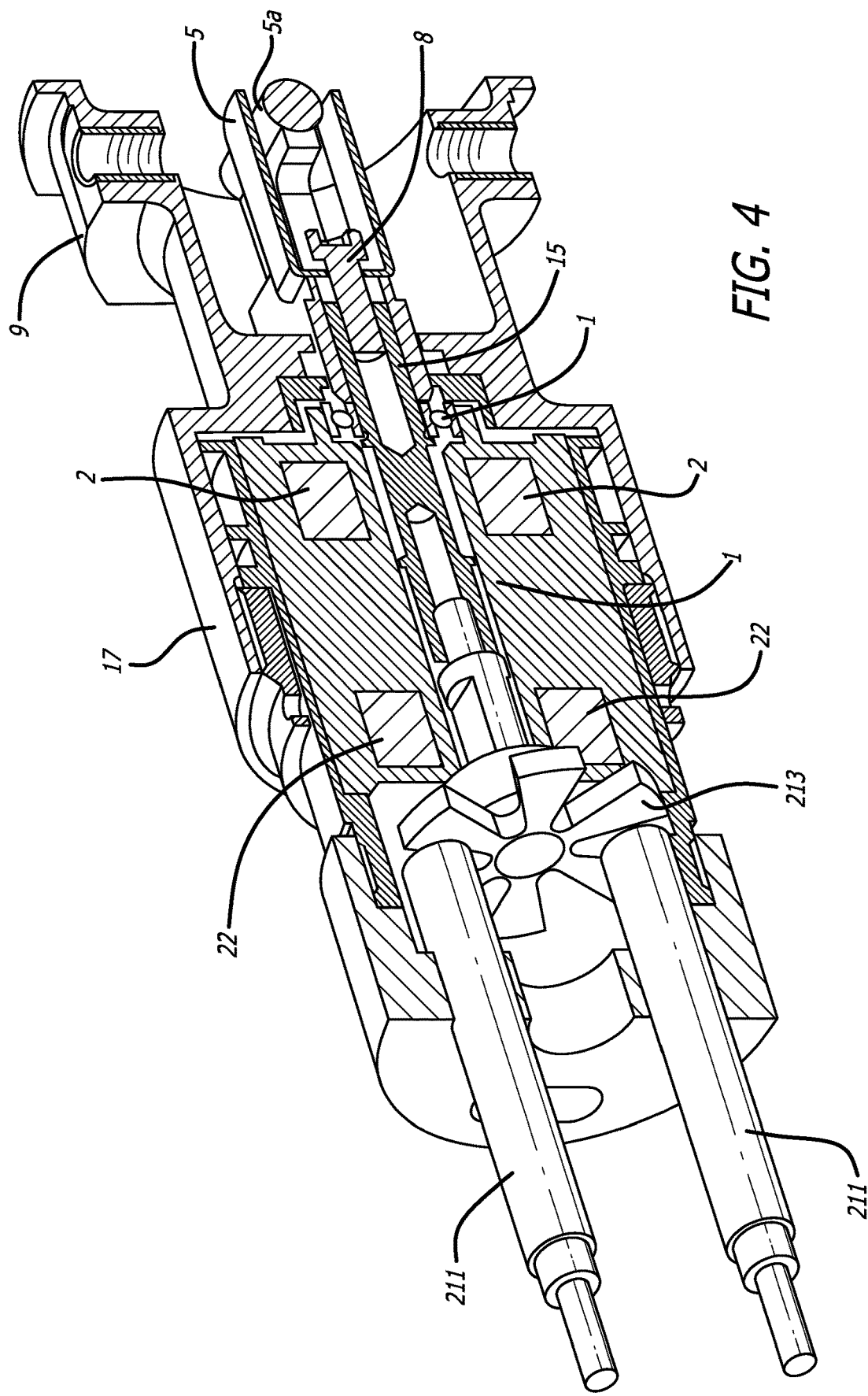
FIG. 4 is an enlarged, elevated perspective cross-sectional view of a second embodiment of the present invention.

FIG. 4 illustrates a cross sectional view of another alternate embodiment of a wheel speed transducer 100. Adapter 5 includes a cylindrical bar 5A that transfers rotation of the aircraft landing gear's axle to the adapter 5 and through to the main shaft 15 via the fastener 8. The magnetic encoder in the previous embodiment has been replaced with a pair of inductive probes 211 (also referred to in the art as inductive proximity sensors or inductive proximity switches) adjacent to a toothed metal wheel 213. As a tooth on the wheel passes proximally to the sensor, the magnetic field surrounding the coil is changed. As a result of the magnetic field changes in the inductive probe a voltage is induced that is proportional to the strength and rate of change of the magnetic field. One complete oscillation is produced for each tooth that passes adjacent to the sensor pole pin. The use of two inductive probes produces electrical quadrature signals analogous to those produced by the magnetic encoder and optical encoder embodiments. If the toothed wheel is permanently magnetized, then Hall Effect probes can be used in place of the inductive probes 211 to provide the secondary electrical signals in the same form of quadrature that represents rotational position and velocity of the rotating shaft. Capacitive probes (capacitive proximity sensors) may also be used in place of inductive probes in a functional similar embodiment of this invention, i.e., the capacitive probes would trigger with the passage of a toothed wheel.

A key feature of all of these embodiments is that the secondary, independent measurement of rotational position and velocity is independent of the primary angular velocity measurement(s) from the variable reluctance device. In this manner, the dual position and velocity transducer utilizes both variable reluctance and a secondary low speed technology to evaluate aircraft wheel speed at variable speeds in both forward and reverse directions.

Figure 5:
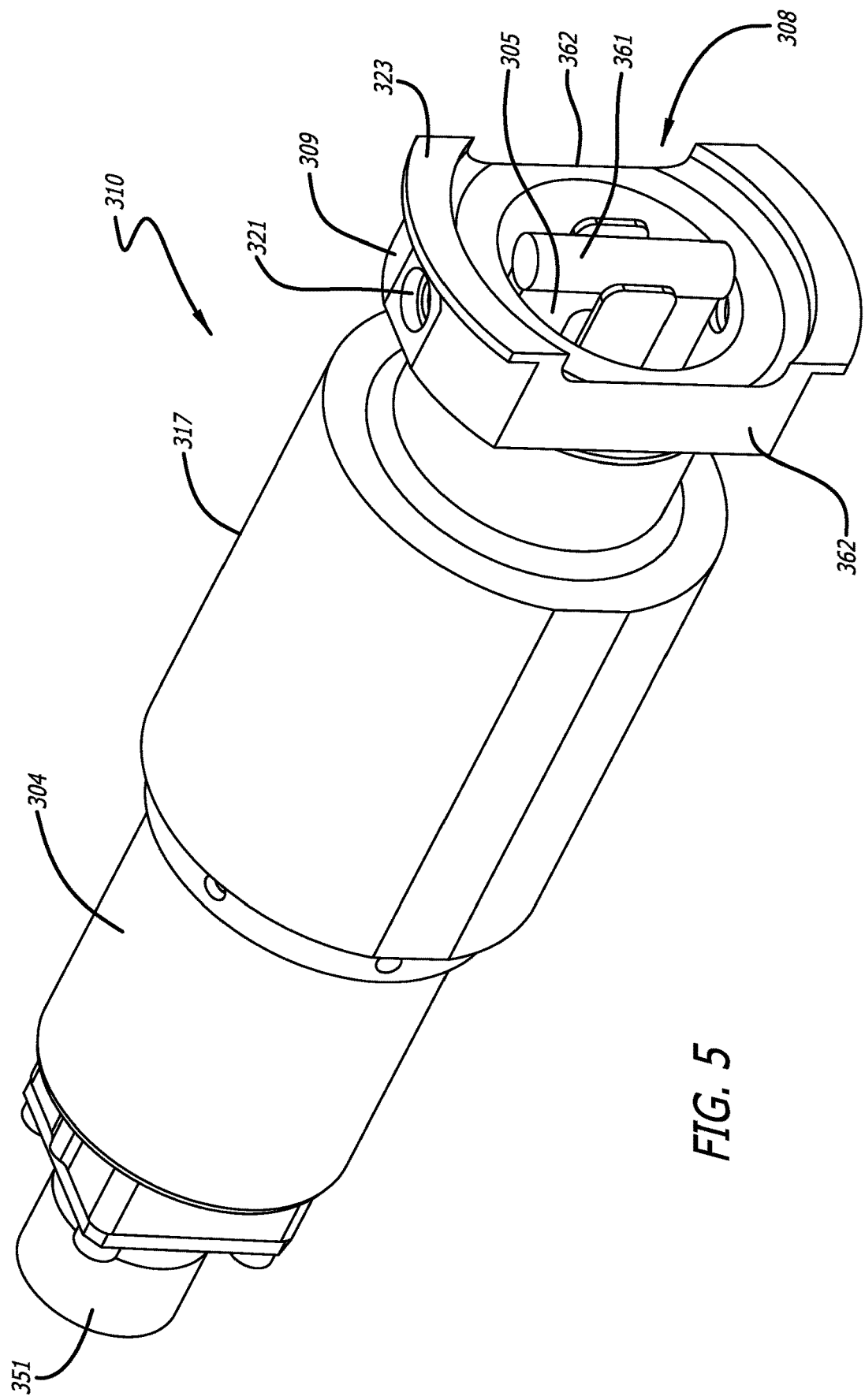
FIG. 5 is an elevated, perspective view of another embodiment of the present invention.
Figure 6:
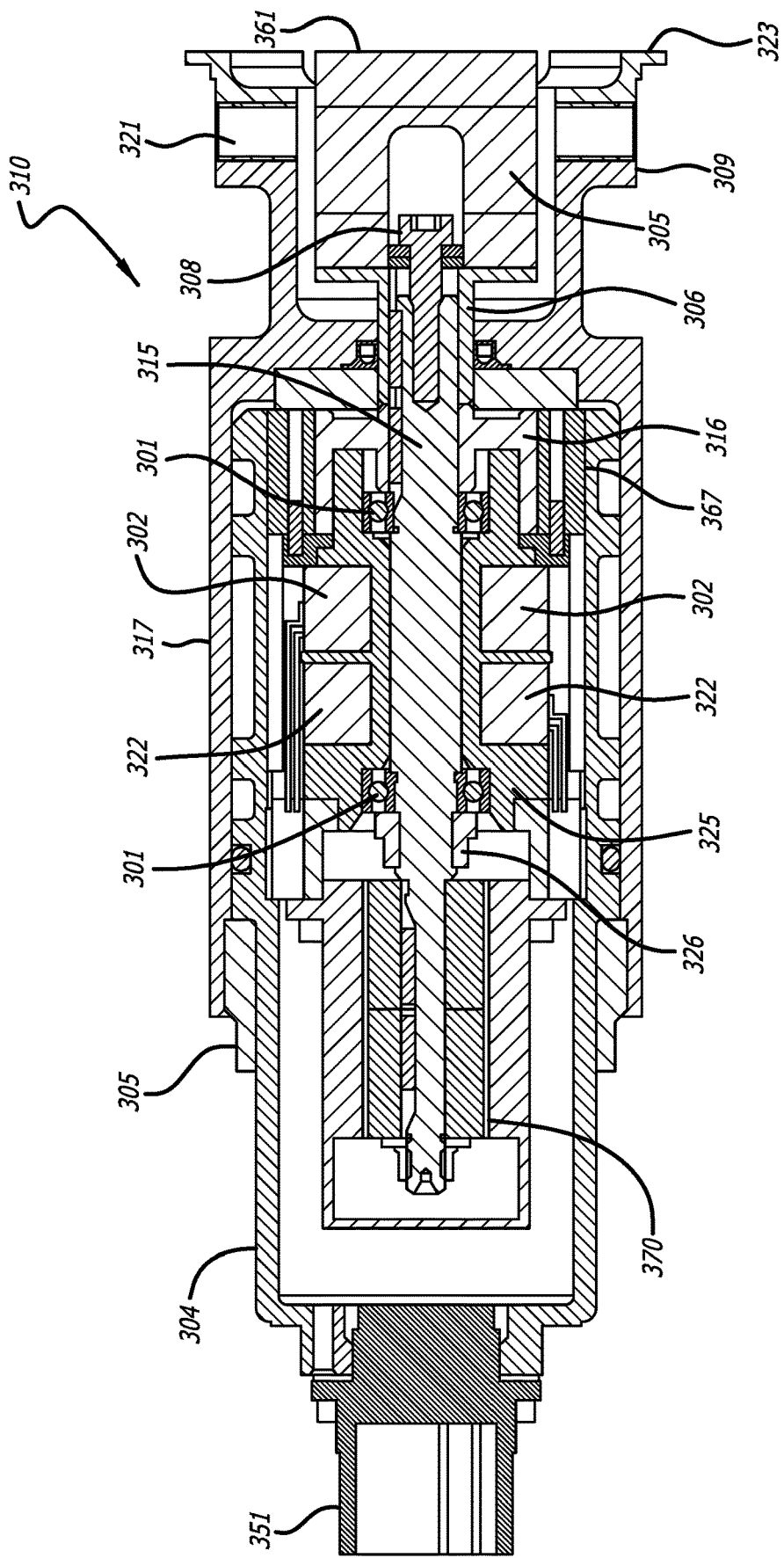
FIG. 6 is a cross sectional view of the embodiment of FIG. 5.

FIGS. 5 and 6 illustrate another embodiment of the present invention, which is a variant of the device of FIGS. 2 and 4. This device uses a dual coil variable reluctance primary speed measuring component in a manner similar to the earlier embodiments, and adds a dual channel secondary position/direction measuring device all contained within a common housing. The redundancy of the variable reluctance system combined with the multi-channel secondary speed sensor provides reliability not found is a single housing device. While a dual—dual device is depicted, the invention is not limited to two channel devices and should be considered to include both a variable reluctance (primary) measuring component having any number of channels/coils combined with a secondary component having any number of channels/coils.

Wheel speed transducer 310 includes a cylindrical body section 317 mounted over a cylindrical cover 304 that houses the components of the transducer 310. At a proximal end of the wheel speed transducer 310 is a coupling assembly for transferring a rotation of the aircraft wheel to the wheel speed transducer. The coupling assembly 308 includes a cylindrical bar 361 at the proximal end of a coupling plate 305 that rotates an internal shaft 315 via a fastener 308. The coupling plate 305 and cylindrical bar 361 form part of a coupling assembly 308 that includes a flanged wheel axle adapter 309 formed with transverse holes 321 for receiving a fastener or pin (not shown) that connects the transducer 310 to the wheel axle. The flanged wheel axle adapter 309 has a radial lip 323 forming a circumferential edge, and the flanged wheel axle adapter 309 is further formed with first and second truncated, flattened sides 362 and a hollow interior space. It is to be understood that various aircraft configurations will require different types of adapter components to convey the rotation of the axle to the measuring device. The present example is but one of many different types of adapters that may be used. Within the hollow interior space of the flanged wheel axle adapter 309 is the fastener 308 that is tapped or threaded into a central shaft 315, causing the central shaft to rotate with the cylindrical bar 361 and coupling plate 305 through its connection to the aircraft wheel. The shaft 315 is supported proximally and distally by a bearings 301 that allow the shaft 315 to rotate freely within the transducer 310. A threaded nut 326 mounts the distal bearings 301 in place, while rotor 316 helps to secure the proximal bearing 301.

Within the transducer's housing, the assembly includes a dual channel variable reluctance speed detector 325 having a primary coil 302 and a secondary coil 322 about the central shaft 315. The variable reluctance speed detector assembly is used for antiskid control and is typically relied upon for speeds above ten knots. The rotor 316 and stator 367, and accompanying electronics function in a well-known manner akin to the embodiments described above to generate a somewhat sinusoidal output signal (or signals in this case of a dual coil assembly) having a frequency that varies linearly as a function of instantaneous wheel speed.

Additionally disposed in the body 317 of the transducer is a multi-channel angular resolver 370 positioned about the distal end of the shaft 315. The signals from the multi-channel angular resolver 370 and the dual coil variable reluctance component are relayed to the onboard computer for evaluating the speed, direction, and position of the wheels at a given instant. The inclusion of the dual coil variable reluctance wheel speed component and a multi-channel angular resolver in the same sealed solid state housing is unique to the aviation industry and especially well-suited for unmanned flight.

The present invention, which uses both primary and secondary measuring technologies in a single transducer package is, unlike prior art systems, both robust for the flight-safety critical purpose of anti-skid brake control and effective in measuring large and small angular velocities in both directions. This improves safety and allows for better control of unmanned vehicle taxi control as well as other landing functions. While the present invention has been described in shown in terms of a preferred embodiment, it is to be understood that one of ordinary skill in the art would readily appreciate modifications and substitutions to the foregoing examples, and the present invention is intended to encompass all such modifications and substitutions.

I claim:

1. A multi-function wheel speed transducer for an aircraft braking system, comprising:
   a housing defining a hollow central interior;
   a shaft extending longitudinally within said housing and mounted for rotation therein;
   a variable reluctance wheel speed detector having a rotor and a stator within said housing; and
   a secondary, angular wheel position and speed measuring component disposed about the shaft within the housing, the secondary, angular wheel position and speed measuring component being independent of the variable reluctance wheel speed detector and configured for distinguishing between a forward and reverse wheel speed.

2. The multi-function wheel speed transducer of claim 1, wherein the variable reluctance wheel speed detector is a dual channel detector for redundantly protecting against a failure.

3. The multi-function wheel speed transducer of claim 2, wherein the secondary, angular wheel position and speed measuring component is a dual channel device for redundantly protecting against a failure.

4. The multi-function wheel speed transducer of claim 1, wherein the secondary, angular wheel position and speed measuring component is a dual channel device for redundantly protecting against a failure.

* * * * *